US006752361B2

(12) United States Patent
Chou

(10) Patent No.: US 6,752,361 B2
(45) Date of Patent: Jun. 22, 2004

(54) PIPE SUPPORTING STRUCTURE

(75) Inventor: Tsuyoshi Chou, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/224,007

(22) Filed: Aug. 19, 2002

(65) Prior Publication Data

US 2003/0042372 A1 Mar. 6, 2003

(30) Foreign Application Priority Data

Aug. 31, 2001 (JP) ........................................ 2001-262920

(51) Int. Cl.[7] ................................................ F16L 3/12
(52) U.S. Cl. .................................................. 248/74.1
(58) Field of Search .............................. 248/74.1, 74.4, 248/74.2, 62, 63, 610, 611, 612, 613; 285/24, 419, 136.1, 921; 296/208

(56) References Cited

U.S. PATENT DOCUMENTS

| | | | | |
|---|---|---|---|---|
| 4,273,367 A | * | 6/1981 | Keeney et al. ............... 285/419 |
| 4,409,950 A | * | 10/1983 | Goldberg .................... 123/573 |
| 4,795,197 A | | 1/1989 | Kaminski et al. |
| 5,015,013 A | | 5/1991 | Nadin |
| 5,272,286 A | * | 12/1993 | Cain et al. ................... 181/206 |
| 5,406,032 A | * | 4/1995 | Clayton et al. .............. 174/151 |
| 5,421,541 A | * | 6/1995 | Condon ........................ 248/56 |
| 5,544,849 A | * | 8/1996 | Peterson et al. ............ 248/74.1 |
| 5,594,202 A | * | 1/1997 | Tobias .......................... 174/48 |
| 5,739,468 A | * | 4/1998 | Rossman et al. .......... 174/65 G |
| 5,898,140 A | * | 4/1999 | Asao et al. .................. 181/272 |
| 6,180,882 B1 | * | 1/2001 | Dinh ........................ 174/65 SS |
| 6,241,199 B1 | * | 6/2001 | Ismert .......................... 248/56 |
| 2002/0100843 A1 | * | 8/2002 | Schmidt ....................... 248/72 |
| 2002/0121404 A1 | * | 9/2002 | Storm ......................... 181/228 |

FOREIGN PATENT DOCUMENTS

| | | | |
|---|---|---|---|
| DE | 200 00 241 U1 | * | 6/2000 |
| FR | 2 772 107 | | 6/1999 |
| JP | 10-318063 | | 12/1998 |

* cited by examiner

Primary Examiner—Leslie A. Braun
Assistant Examiner—Kofi Schulterbrandt
(74) Attorney, Agent, or Firm—Merchant & Gould, P.C.

(57) ABSTRACT

A pipe supporting structure includes a cylindrical sleeve mounted around a pipe, and first and second wall members. The first wall member is spaced from the second wall member by an interval smaller than a length of the sleeve. The first wall member has a first aperture formed therein while the second wall member has a second aperture formed therein. The sleeve is inserted through the first and second apertures such that the pipe is supported by the first and second wall members.

17 Claims, 3 Drawing Sheets

PIPE SUPPORTING STRUCTURE

FIELD OF THE INVENTION

The present invention relates to an improvement in a pipe supporting structure.

BACKGROUND OF THE INVENTION

Known pipe supporting structures include stationary members such as vehicular frames for supporting pipes. One example of such pipe supporting structures is disclosed in Japanese Patent Laid-Open Publication No. HEI-10-318063 entitled "PIPE SUPPORTING STRUCTURE".

The disclosed pipe supporting structure includes a frame having inner and outer walls. The inner wall is spaced from the outer wall by an interval smaller than the length of a pipe. The outer wall has a first aperture formed therein while the inner wall has a second aperture formed therein. The structure includes an outer support member having the pipe mounted thereon. The inner wall has an inner support member attached to an exterior surface thereof formed oppositely from the outer wall.

The pipe mounted in the outer support member is inserted through the first aperture and then through the second aperture, such that the pipe has its distal end fitted to the inner support member. The outer support member is subsequently attached to the outer wall. This makes it possible for the inner and outer walls to support the pipe.

In order for the inner and outer walls to support the pipe, the inner support member must be attached to the exterior surface of the inner wall prior to the insertion of the pipe. Therefore, a space provided on the side of the inner wall should be large enough to allow an operator to attach the inner support member to the inner wall. If such a space is small, the attachment of the inner support member to the inner wall cannot be easily achieved. Mounting the pipe to the frame cannot be effected without requiring the inner support member. This means that the structure includes the increased number of components. The structure thus arranged is complicated in construction.

SUMMARY OF THE INVENTION

An object of the present invention is to provide a pipe supporting structure of simple construction. The structure is formed by the reduced number of components. Using such a structure facilitates the attachment of pipe to the frame.

According to one aspect of the present invention, there is provided a pipe supporting structure comprising: a cylindrical sleeve to be mounted around a pipe; a first wall member having a first aperture formed therein; a second wall member having a second aperture formed therein; the first wall member and the second wall member being spaced from each other by an interval smaller than a length of the sleeve; and the sleeve being inserted through the first and second apertures such that the pipe is supported by the first and second wall members.

Only one step of inserting the sleeve, mounted around the pipe, from the side of the first or second wall members through the first and second apertures is required to mount the pipe to the first and second wall members. In other words, the small number of steps is required to mount the pipe to the first and second wall members.

Since the sleeve mounted around the pipe is inserted from the side of the first or second wall member through the first and second apertures to thereby mount the sleeve to the first and second wall members, a space formed on the side opposite from the side on which the sleeve is positioned in preparation for insertion into the first and second wall members need not be large enough to allow an operator to perform the insertion of the sleeve. Therefore, even if such a space formed on the opposite side is small, the insertion of the pipe to the first and second wall members can be readily achieved.

Only the sleeve is required to mount the pipe to the first and second wall members. The members necessary to mount the pipe to the first and second wall members can be provided in small number.

Preferably, the sleeve is halved into a first sleeve half and a second sleeve half.

The sleeve thus arranged can be easily mounted around or removed from the pipe.

Preferably, the first aperture is larger in diameter than the second aperture, and the sleeve is inserted through the first aperture and then through the second aperture.

If the first and second apertures are equal in diameter to each other, the sleeve and the first and second apertures should be formed with enhanced precision to accomplish the smooth insertion of the sleeve into the apertures.

If the first aperture is smaller in diameter than the second aperture, it would be impossible to insert the sleeve through the first aperture and then through the second aperture.

This is why the first aperture is larger in diameter than the second aperture to achieve the insertion of the sleeve through the first aperture and then through the second aperture. The sleeve should not have precise dimension along the length thereof. Nor should the first and second apertures be formed with increased precision. The sleeve can thus be readily fitted into the first and second apertures.

Preferably, the sleeve includes stopper claws projecting radially outwardly therefrom into engagement with the first wall member, and unlocking members to be forced to move the stopper claws radially inwardly of the sleeve.

The sleeve further includes the stopper claws projecting radially outwardly therefrom into engagement with the first wall member. The sleeve includes the unlocking members arranged to force the stopper claws to move radially and inwardly of the sleeve. Disengagement of the stopper claws from the first wall member requires only one step of forcing the unlocking members to move radially inwardly of the sleeve.

In inserting the sleeve through the first aperture and then through the second aperture, the unlocking members are handled or operated on the side of the first wall member. Therefore, the mounting operation and removal operation of the sleeve can be carried out only on the side of the first wall member.

Preferably, the sleeve includes first positioning claws engaging the first wall member, and second positioning claws engaging the second wall member. The first positioning claws prevent the sleeve from shifting both radially and axially of the sleeve. The second positioning claws prevent the sleeve from shifting radially of the sleeve.

The interval between the first wall member and the second wall member need not be set with enhanced precision. The thus arranged sleeve can be easily mounted to the first and second wall members.

Preferably, the sleeve includes a projecting member for preventing the sleeve from pivoting on the projecting member, and the sleeve has a drainage aperture formed at a lowermost portion of an interior surface thereof.

The drainage aperture is always located at the lowest level. With this arrangement, water entered into a space between the pipe and the sleeve is allowed to flow out through the drainage aperture. This makes it possible to provide the pipe with increased resistance to erosion caused by the entered water.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENTS

Figure 1:
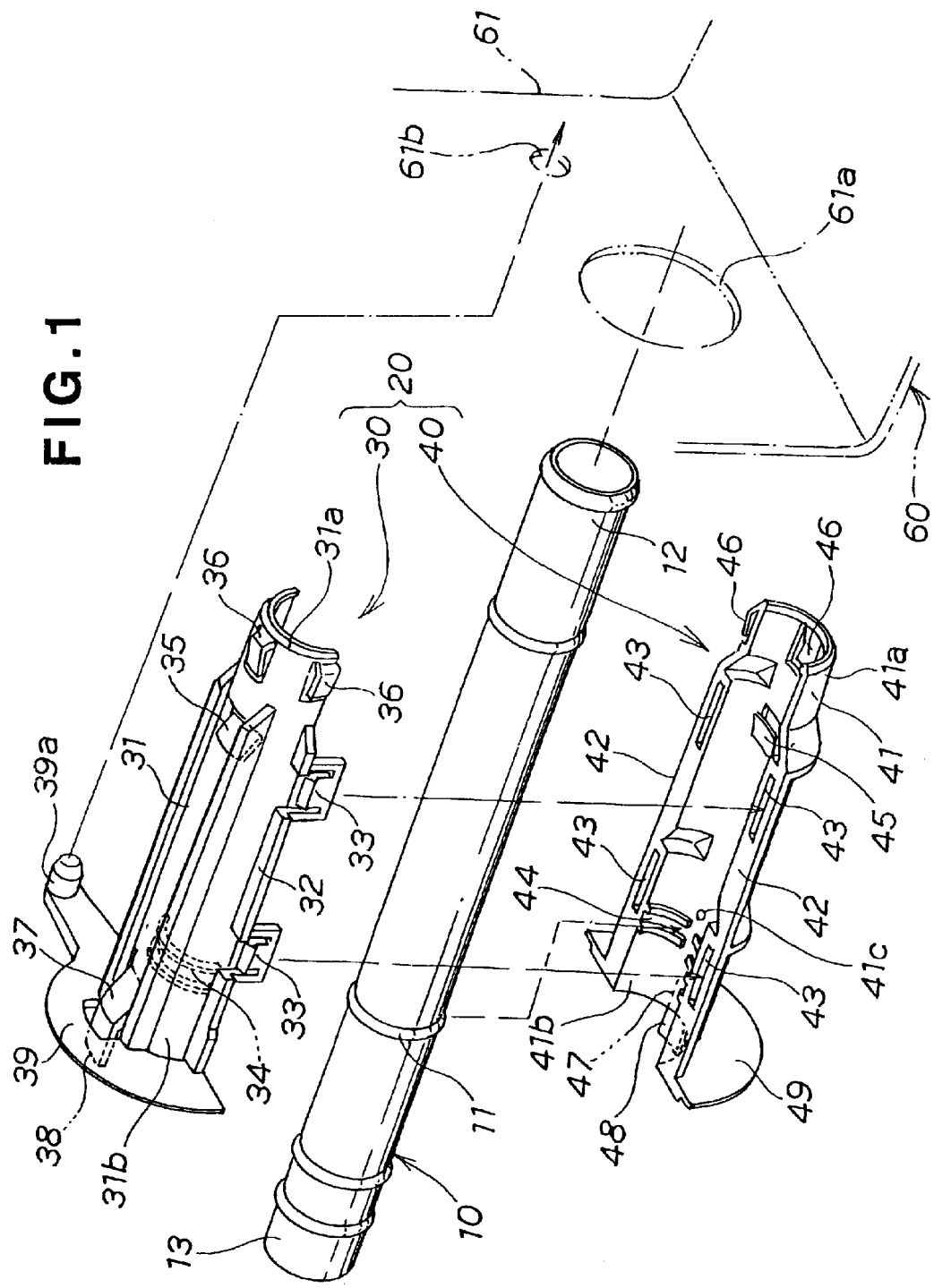
FIG. 1 is an exploded perspective view of a sleeve of a pipe supporting structure to be mounted around a pipe.

Referring to FIG. 1, a pipe 10 is attachable to a frame 60 by means of a cylindrical sleeve 20.

The pipe 10 is used as a breather pipe to be connected to a fuel tank for a vehicle (not shown). The pipe 10 has an engagement projecting portion 11 formed integrally with an exterior surface thereof. The projecting portion 11 is ring-shaped and extends about the outer surface of the pipe 10. The pipe 10 is made from steel.

The sleeve 20 is a cylindrical member through which the pipe 10 is to be inserted. The sleeve 20 is made by molding resin such as polypropylene. The sleeve 20 can be halved into first and second sleeve halves 30, 40 to be coupled together. These halves 30, 40 extend along the length of the pipe 10.

The first sleeve half 30 includes a semicylindrical body 31. The body 31 has flanges 32, 32 (only one shown in this figure) provided on opposite sides thereof. The flanges 32, 32 each include plural resilient locking claw portions 33. The body 31 has an engagement groove 34 formed in an interior surface thereof. The groove 34 extends in the form of a semicircle. The body 31 has a pipe pressing member 35 projecting radially inwardly from the interior surface thereof. The pipe pressing member 35 is resilient. The body 31 has plural resilient fitting members 36 formed at one end 31a thereof. The fitting member 36 is flexible or deformable in a radial direction of the body 31. The body 31 has a resilient stopper member (a resilient stopper claw) 37 provided at the opposite end 31b thereof. The stopper member 37 is flexible or deformable in the radial direction of the body 31. Provided at the end 31b is an unlocking member 38 to be forced in such a manner as to move the stopper member 37 radially inwardly of the body 31. At the end 31b, there is also provided a limiter member 39 for use as a flange. The limiter member 39 is positioned outside the stopper member 37. The limiter member 39 has a positioning portion (a projecting member) 39a projecting from an end thereof towards the end 31a. The flanges 32, 32 are formed integrally with the body 31. The locking claw portions 33 are formed integrally with the flange 32. The pipe pressing member 35 is formed integrally with the body 31. The fitting member 36 is formed integrally with the body 31. The stopper member 37 is integral with the body 31. The unlocking member 38 is formed integrally with the stopper member 37. The limiter member 39 is formed integrally with the body 31. The positioning portion 39a is provided integrally with the limiter member 39.

The second sleeve half 40 includes a semicylindrical body 41. The body 41 has flanges 42, 42 formed on opposite sides thereof. Each flange 42 has plural locking apertures 43 formed therein. The body 41 has an engagement groove 44 formed in an interior surface thereof. The groove 44 extends in the form of a semicircular. The body 41 has a resilient pipe pressing member 45 projecting radially inwardly from the interior surface thereof. The body 41 has a plurality of resilient fitting members 46 provided at one end 41a thereof. The fitting member 46 is flexible or deformable in a radial direction of the body 41. The body 41 has a resilient stopper member (a resilient stopper claw) 47 provided at the other end 41b thereof. The stopper member 47 is flexible or deformable radially of the body 41. At the other end 41b of the body 41, there is provided an unlocking member 48 to be forced in such a manner as to move the stopper member 47 radially inwardly of the body 41. Provided at the other end 41b is a limiter member 49 for use as a flange. The limiter member 49 is positioned outside the stopper member 47. A lowermost portion of the interior surface of the body 41 has a drainage aperture 41c formed therethrough. The drainage aperture 41c extends in a direction perpendicular to the pipe 10. The flange 42 is formed integrally with the body 41. The pipe pressing member 45 is integral with the body 41. The fitting member 46 is formed integrally with the body 41. The stopper member 47 is formed integrally with the body 41. The unlocking member 48 is integral with the stopper member 47. The limiter member 49 is formed integrally with the body 41.

In mounting the pipe 10 to the sleeve 20, the pipe 10 is positioned between the first and second sleeve halves 30, 40 with the flanges 32, 32 opposed to the flanges 42, 42 and with the projecting portion 11 aligned with the grooves 34, 44. The locking claw portions 33 then snaps by engaging the locking apertures 43 while the projecting portion 11 is fitted into the grooves 34, 44. This allows the first sleeve half 30 to be detachably coupled to the second sleeve half 40 to thereby provide the sleeve 20 having the pipe 10 extending therethrough.

The positioning portion 39a is fitted into an engagement aperture 61b to thereby mount the sleeve 20 to the frame 60. The first sleeve half 30 is positioned above the second sleeve half 40 with the drainage aperture 41c positioned at the lowest level.

Figure 2:
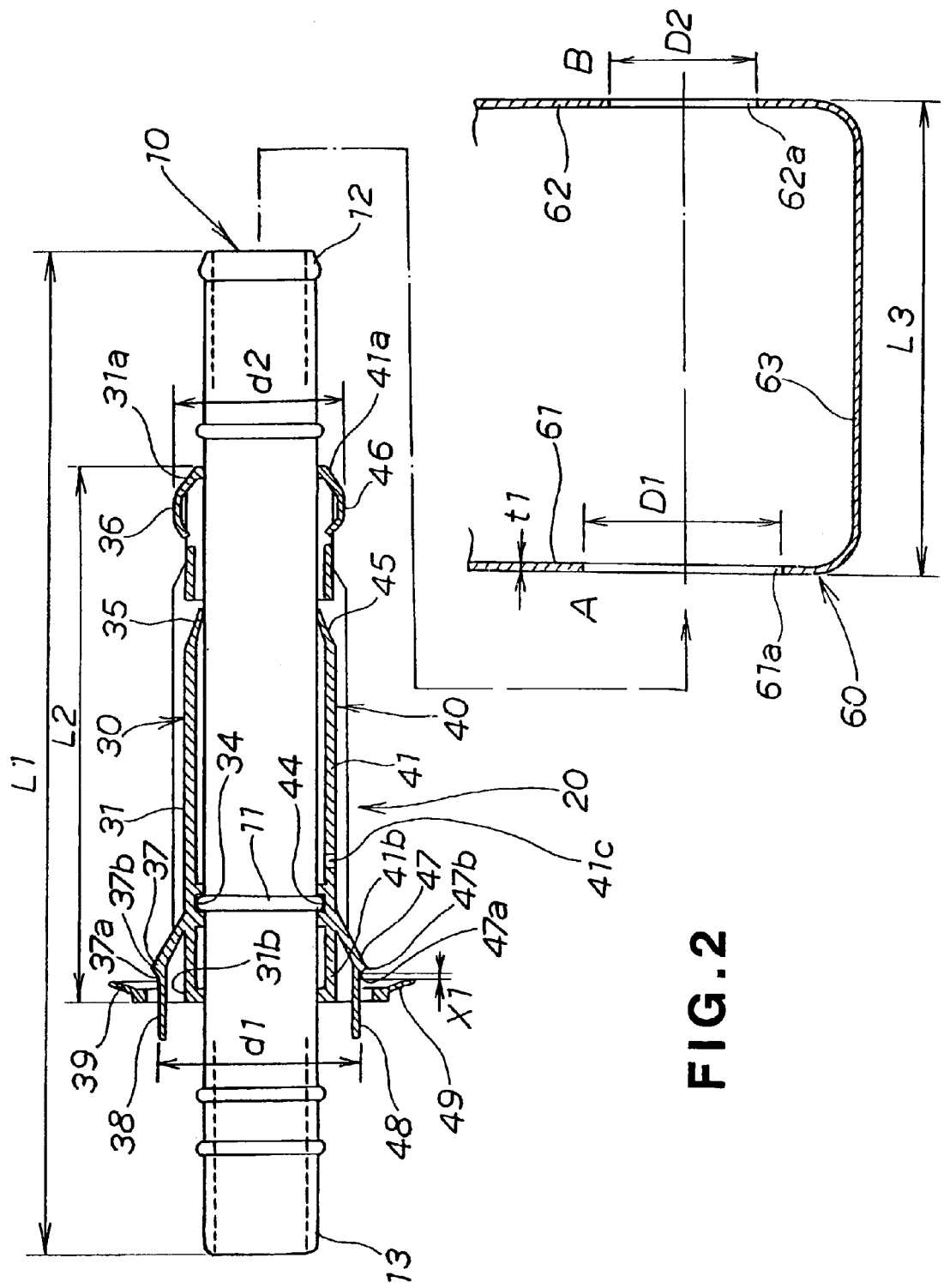
FIG. 2 is a cross-sectional view of the sleeve having the pipe mounted therein and a frame of the pipe supporting structure, the sleeve and the frame being separated from each other.

Turning to FIG. 2, the sleeve 20 is shown as being mounted around the pipe 10. The projecting portion 11 is fitted into the grooves 34, 44 to thereby prevent the sleeve 20 from shifting longitudinally of the pipe 10.

The pressing members 35, 45 are resiliently flexible or deformable in a radial direction of the pipe 10, and are held or clamped against an exterior surface of the pipe 10 to thereby prevent the sleeve 20 from rattling radially or transversely of the pipe 10.

The stopper members 37, 47 extend outwardly and upwardly to provide ridged portions 37b, 47b. The ridged portions 37b, 47b have sloped portions continuous with valley or bottom portions 37a, 47a. The unlocking members 38, 48 horizontally extend from the base portions 37a, 47a out of the limiter members 39, 49. The limiter members 39, 49 have their outer peripheral edges slightly bent towards the ends 31a, 41a of the sleeve 20. The limiter members 39, 49 are resiliently flexible or deformable in a longitudinal direction of the sleeve 20.

The pipe 10 has its length L1 larger than the length L2 of the sleeve 20.

The frame 60 includes a first wall member 61 and a second wall member 62 spaced from the first wall member 61 by an interval L3 smaller than the length L2. The first and second wall members 61, 62 are connected to each other by a bottom sheet 63. The first wall member 61 has a first aperture 61a formed therein whilst the second wall member 62 has a second aperture 62a formed therein. The first aperture 61a is in a concentric relation to the second aperture 62a.

The first aperture 61a is of enlarged diameter while the second aperture 62a is of reduced diameter. More specifically, the diameter D1 of the first aperture 61a is larger than the diameter D2 of the second aperture 62a (D1>D2).

A distance d1 between the bottom portions 37a, 47a is slightly larger than the diameter D1 of the first aperture 61a (d1>D1). A distance d2 between the resilient fitting members 36, 46 is slightly larger the diameter D2 of the second aperture 62a (d2>D2).

The relation between the diameters D1, D2 and the distances d1, d2 is expressed by: d1>D1>d2>D2.

A distance x1 between the bottom portion 37a and the outer peripheral edge of the limiter member 39 or between the bottom portion 47a and the outer peripheral edge of the limiter member 49 is slightly smaller than the thickness t1 of the first wall member 61 (x1<t1).

The ends 31a, 41a of the bodies 31, 41 are inserted through the first aperture 61a and then through the second aperture 62a to thereby attach the sleeve 20 to the first and second wall members 61, 62.

Figure 3:
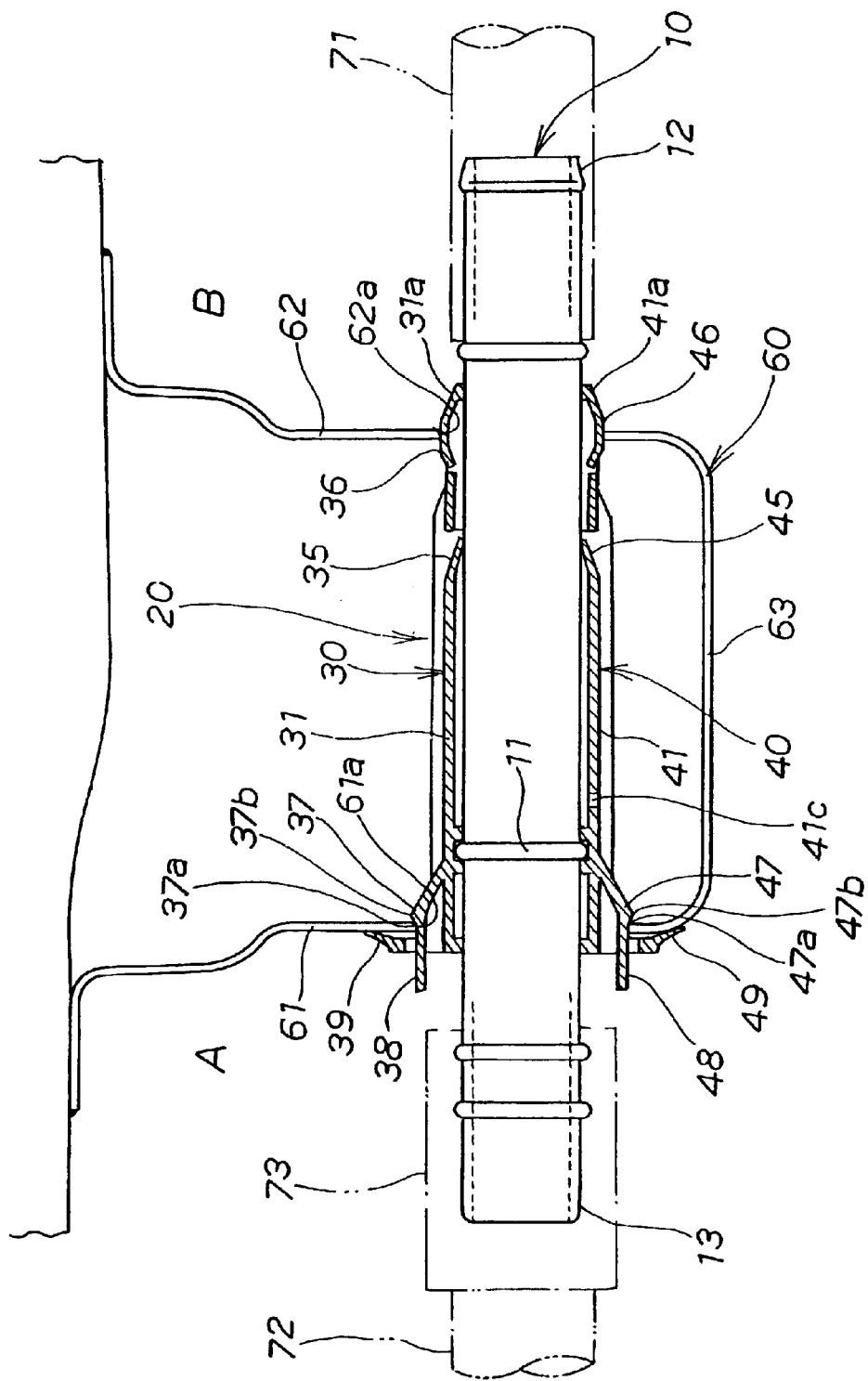
FIG. 3 is a cross-sectional view of the sleeve having the pipe mounted therein and the frame of the pipe supporting structure, the sleeve being mounted in the frame.

Referring to FIG. 3, the sleeve 20 having the pipe 10 mounted therein is shown inserted through the first and second wall members 61, 62.

The stopper members 37, 47 are resiliently flexed to bring the bottom portions 37a, 47a into engagement with an edge of the first wall member 61 defining the first aperture 61a. Meanwhile, the resilient fitting members 36, 46 are resiliently fitted into the second aperture 62a. This arrangement allows the sleeve 20 to be mounted to the first and second wall members 61, 62.

The first wall member 61 is held or sandwiched between the stopper member 37 and the outer peripheral edge of the limiter member 39 as well as between the stopper member 47 and the outer peripheral edge of the limiter member 49 to thereby prevent the sleeve 20 from coming out of the first and second apertures 61a, 62a.

The sleeve 20 can be withdrawn from the first and second wall members 61, 62 as follows.

The unlocking members 38, 48 are forced by hand to move radially and inwardly of the pipe 10 to thereby disengage the stopper members 37, 47 from the edge of the first wall member 61 defining the first aperture 61a. The sleeve 20 is subsequently pulled towards an insertion side A with the unlocking members 38, 48 thus forced radially and inwardly of the pipe 10. This allows the sleeve 20 having the pipe 10 inserted therethrough to be pulled out of the frame 60.

The pipe 10 has its one end 12 inserted into a hose 71. The opposite end 13 of the pipe 10 is mounted to a hose 72 by means of a coupler 73.

The sleeve 20 is mounted around the pipe 10 and then inserted through the first and second apertures 61a, 62a formed in the first and second wall members 61, 62, respectively, such that the pipe 10 is supported by the first and second wall members 61, 62. The sleeve 20 holding the pipe 10 therein is mounted to the first and second wall members 61, 62 by passing through the first aperture 61a and then through the second aperture 62a. In other words, only one step of inserting the sleeve 20 from the insertion side A through the apertures 61a, 62a to the side B is required to mount the pipe 10 to the frame 60.

Because the sleeve 20 having the pipe 10 mounted therein is inserted from the insertion side A through the aperture 61a, 62a to the opposite side B, a sufficiently large space where an operator can insert the sleeve 20 into the frame 60 need not be formed on the side B. Thus, even if such a space formed on the side B is small, the pipe 10 can be readily mounted to the frame 60.

As is apparent from the foregoing, only the sleeve 20 of simple construction is required to mount the pipe 10 to the frame 60. This means that the pipe supporting structure can be formed by the reduced number of components.

Since the sleeve 20 can be halved, it can be easily mounted around or removed from the pipe 10.

As discussed above, the first aperture 61a is of enlarged diameter whilst the second aperture 62a is of reduced diameter. The first aperture 61a is larger in diameter than the second aperture 62a. The sleeve 20 is inserted through the first aperture 61a and then through the second aperture 62a. Thus, the sleeve 20 need not have its precise dimension along the length thereof. The sleeve 20 may have precise dimensions only at portions thereof to correspond to the apertures 61a, 62a. Likewise, the first and second apertures 61a, 62a need not be formed with enhanced precision.

As described above, the sleeve 20 includes the stopper members 37, 47 projecting radially outwardly therefrom into engagement with the edge of the first wall member 61 defining the aperture 61a. The sleeve 20 also includes the unlocking members 38, 48 to be forced in such a manner as to move the stopper members 37, 47 radially and inwardly of the sleeve 20. Therefore, only one step of forcing the stopper members 37, 47 to move radially and inwardly is required to unlock or release the sleeve 20 from the first wall member 61.

In inserting the sleeve 20 through the first aperture 61a and then through the second aperture 62a, the operator handles or operates the unlocking members 38, 48 only on the side A. More specifically, the mounting operation and the removal operation of the sleeve 20 can be performed only on the side A.

The stopper members (first positioning claws) 37, 47 are resiliently deformed to engage the first wall member 61 in such a manner as to prevent the sleeve 20 from being displaced or shifted axially and radially thereof. The fitting members (second positioning claws) 36, 46 are resiliently deformed to engage the second wall member 62 in such a manner as to prevent the sleeve 20 from being displaced or shifted radially thereof. Provision of the stopper members 37, 47 and the fitting members 36, 46 eliminates the need to precisely set the length of the interval L3 between the first wall member 61 and the second wall member 62. With this arrangement, it becomes possible to readily mount the sleeve 20 to the first and second wall members 61, 62.

The positioning portion (projecting member) 39a fitted into the engagement aperture 61b formed in the first wall member 61 prevents the sleeve 20 from pivoting or turning on the positioning portion 39a. The sleeve 20 is mounted to the frame such that the drainage aperture 41c is located at the lowermost position of the interior surface of the body 41. In other words, the drainage aperture 41c is always located at the lowest level when the sleeve 20 is mounted to the frame 60. This arrangement allows water entered into a space between the pipe 10 and the sleeve 20 to flow out through the drainage aperture 41c. There is no fear that the pipe 10 is eroded by water entered thereinto.

The pipe supporting structure is applicable to alternatives other than vehicles. The pipe 10 is not limited to the breather pipe to be connected to the fuel tank of the vehicle.

Although the first wall member 61 is connected via the bottom sheet 63 to the second wall member 62 in the illustrated embodiment, the first and second wall members 61, 62 may be disposed separately from each other.

The present disclosure relates to the subject matter of Japanese Patent Application No. 2001-262920, filed Aug. 31, 2001, the disclosure of which is expressly incorporated herein by reference in its entirety.

What is claimed is:

1. A pipe supporting structure comprising:
    a cylindrical sleeve to be mounted around a pipe;
    a first wall member having a first aperture formed therein;
    a second wall member having a second aperture formed therein;
    said first wall member and said second wall member being spaced from each other by an interval smaller than a length of said sleeve; and
    said sleeve being inserted through said first and second apertures such that said pipe is supported by said first and second wall members, wherein said sleeve includes stopper claws projecting radially outwardly therefrom into engagement with said first wall member, and unlocking members to be forced to move said stopper claws radially inwardly of said sleeve.

2. A pipe supporting structure as claimed in claim 1, wherein said sleeve is halved into a first sleeve half and a second sleeve half.

3. A pipe supporting structure as claimed in claim 1, wherein said first aperture is larger in diameter than said second aperture, and said sleeve is inserted through said first aperture and then through said second aperture.

4. A pipe supporting structure comprising:
    a cylindrical sleeve to be mounted around a pipe;
    a first wall member having a first aperture formed therein;
    a second wall member having a second aperture formed therein;
    said first wall member and said second wall member being spaced from each other by an interval smaller than a length of said sleeve; and
    said sleeve being inserted through said first and second apertures such that said pipe is supported by said first and second wall members, wherein said sleeve includes first positioning claws engaging said first wall member, and second positioning claws engaging said second wall member, said first positioning claws preventing said sleeve from shifting in both radial and axial directions thereof relative to the first wall member, said second positioning claws preventing said sleeve from shifting in a radial direction thereof relative to the second wall member.

5. A pipe supporting structure as claimed in claim 1, wherein said sleeve includes a projecting member for preventing said sleeve from pivoting about an axis thereof relative to one of the first and second wall members, and said sleeve has a drainage aperture formed at a lowermost portion of an interior surface thereof.

6. A pipe supporting structure as claimed in claim 4, wherein said sleeve is halved into a first sleeve half and a second sleeve half.

7. A pipe supporting structure as claimed in claim 4, wherein said first aperture is larger in diameter than said second aperture, and said sleeve is inserted through said first aperture and then through said second aperture.

8. A pipe supporting structure as claimed in claim 4, wherein said sleeve includes a projecting member for preventing said sleeve from pivoting about an axis thereof relative to one of the fist and second wall members, and said sleeve has a drainage aperture formed at a lowermost portion of an interior surface thereof.

9. A pipe supporting structure comprising:
    a cylindrical sleeve to be mounted around a pipe;
    a first wall member having a first aperture formed therein;
    a second wall member having a second aperture formed therein;
    said first wall member and said second wall member being spaced from each other by an interval smaller than a length of said sleeve; and
    said sleeve being inserted through said first and second apertures such that said pipe is supported by said first and second wall members,
    wherein the sleeve has a plurality of resilient first locking claws spaced in a circumferential direction of the sleeve and projecting from an outer peripheral surface of the sleeve in a radial outward direction for interlocking engagement with an edge of the first aperture to lock the sleeve in position against movement in both radial and axial directions thereof relative to the first wall member, and a plurality of resilient second locking claws spaced in the circumferential direction of the sleeve and projecting from the outer peripheral surface of the sleeve in a radial outward direction for pressure contact with a circumferential surface of the second aperture of the second wall member to keep the sleeve in position against movement in the radial direction relative to the second wall member.

10. The pipe supporting structure according to claim 9, wherein the sleeve further has an unlocking member formed integrally with each of the resilient first locking claws for undergoing movement in a radial inward direction together with the first locking claw to cause the first locking claw disengaged from the edge of the first aperture of the first wall member.

11. The pipe supporting structure according to claim 9, wherein the sleeve further has an annular end flange disposed close to and spaced from the first locking claws in the axial direction of the sleeve by a distance slightly smaller than a thickness of the first wall member, the annular end flange being resiliently deformable to grip the first wall member between the annular end flange and the first locking claws when the first locking claws are in interlocking engagement with the edge of the first aperture of the first wall member.

12. The pipe supporting structure according to claim 11, wherein the sleeve further has an unlocking member formed integrally with each of the resilient first locking claws for undergoing movement in a radial inward direction together with the first locking claw to cause the first locking claw disengaged from the edge of the first aperture of the first wall member, the unlocking member extending in a direction away from the first locking claw beyond the annular end flange.

13. The pipe supporting structure according to claim 11, wherein the sleeve further has a locking projection disposed on the annular end flange and received in an engagement hole formed in the first wall member so as to lock the sleeve in position again rotation relative to the first wall member.

14. The pipe supporting structure according to claim 9, wherein the sleeve further has a plurality of resilient pipe pressing members spaced in the circumferential direction of the sleeve and projecting from an inner peripheral surface of the sleeve in a radial inward direction for resiliently holding a part of the pipe inside the sleeve.

15. The pipe supporting structure according to claim 12, wherein the plurality of resilient first locking claws comprises two diametrically opposed resilient first locking claws.

16. The pipe supporting structure according to claim 9, wherein the sleeve comprises a first semicylindrical sleeve half and a second semicylindrical sleeve half detachably connected together.

17. The pipe supporting structure according to claim 16, wherein the first and second sleeve halves are formed from synthetic resin.

\* \* \* \* \*